United States Patent [19]

Drori et al.

[11] Patent Number: 5,467,070
[45] Date of Patent: Nov. 14, 1995

[54] VEHICLE SECURITY SYSTEM WITH SECURE VALET SWITCH

[75] Inventors: Ze'ev Drori, Los Angeles; Robert M. Woskow, Encino, both of Calif.

[73] Assignee: Clifford Electronics, Inc., Chatsworth, Calif.

[21] Appl. No.: 17,801

[22] Filed: Feb. 16, 1993

[51] Int. Cl.⁶ ............................................. B60R 25/00
[52] U.S. Cl. ............................. 340/426; 340/425.5
[58] Field of Search ........................ 340/425.5, 426, 340/427, 428, 429, 430

[56] References Cited

U.S. PATENT DOCUMENTS

| | | | |
|---|---|---|---|
| 4,342,024 | 7/1982 | Rossi | 340/64 |
| 4,887,064 | 12/1989 | Drori et al. | 340/426 |
| 4,890,108 | 12/1989 | Drori et al. | 341/176 |
| 4,992,224 | 5/1990 | Drori et al. | 340/428 |
| 5,157,375 | 10/1992 | Drori | 340/429 |

Primary Examiner—Victor R. Kostak
Assistant Examiner—Nathan J. Flynn
Attorney, Agent, or Firm—Roberts and Quiogue

[57] ABSTRACT

A vehicle security system having a secure valet/programming switch. To either enter the system valet mode, or select a function via the valet/programming switch, the user must first enter a valid personal access code via the switch. To prevent an intruder from deciphering the personal code by trying various codes, the system ignores, after a preset number of successive invalid entries, further switch inputs for a preset period of time. When attempts to decipher the code are detected, the alarm is tripped, and the siren will sound. To accommodate various drivers of the same vehicle, more than one valid code can be stored in the system. Any of the personal access codes may be changed any time, but after the user's present code is entered.

72 Claims, 6 Drawing Sheets

VEHICLE SECURITY SYSTEM WITH SECURE VALET SWITCH

BACKGROUND OF THE INVENTION

The present invention relates to electronic vehicle security systems.

Remote control auto security systems have been widely sold in the last ten years. Many millions of these systems have been sold to date. Characteristically most, if not all, of the remote control auto security systems have a "Valet Mode" (VM) toggle switch that essentially turns the security system "off." The valet mode toggle switch enables a vehicle owner to disarm the security system and to drive the vehicle if the remote control was lost or becomes inoperative. What is more, it allows the owner to hand his car to a parking attendant, car wash service, etc., without relinquishing possession of the remote control and without being concerned whether the other person knows how to use the security system.

Although the valet mode is a virtual necessity, its very existence leaves the security system vulnerable to intruders. The reason is that security systems today can be simply put into the valet mode just by turning on (or hot-wiring) the ignition and flipping a toggle switch (valet switch). The vulnerability of the security system due to the valet switch is fully understood by both manufacturers and installers and therefore the switch is installed in a concealed location inside the vehicle. However, since the switch needs to be put in a place accessible to the driver and since there are a limited number of suitable mounting places inside the vehicles, in the majority of the cases the switch is installed in predictable places either in the glove compartment or under the dash or seat. Throughout the decade of the 1980's various solutions that incorporate both economy and security were sought but to no avail. The most obvious attempt was to incorporate a key for the valet switch. The problem with the key switch is that it is just as easy (if not easier) to hot wire it as it would be with the ignition switch. Thus, it did not provide any added tangible security.

Other means that were used included electronic key pads which can provide excellent security if the key pad has digits zero to nine (10 buttons) plus at least one more function button. The shortcoming of the electronic keypad is that it is much more expensive than a simple toggle switch, it takes longer to install, requires higher level of installation skills, and certain vehicles may not have an appropriate space for mounting the key pad.

Another method used in a limited way and all but abandoned involves thumbwheel switches. These switches are similar in concept to a briefcase's thumbwheels, except when the proper code is entered the valet mode is enabled electronically. The disadvantages of thumbwheels switches are that they also are more expensive than toggle switches, installation takes a longer time, the user cannot change the code, it is virtually impossible to enter a code in the dark, and each time immediately after the user dials the code, he or she must dial any invalid code, or else the user's code could be read by anyone who sees the thumbwheel switch.

In summation, even though the regular valet toggle switch provides less security because of cost and installation time considerations, practically all of today's remote control auto security systems, regardless of manufacturer, brand or system type, use it.

SUMMARY OF THE INVENTION

A vehicle security system is disclosed which incorporates a secured valet mode ("SVM") that provides substantial security advantages without any cost increase or added installation time.

Rather than being used merely as an "on/off" switch as in the conventional security systems, the valet toggle switch in accordance with the invention is utilized as a means of entering codes and communication with the security system microprocessor. To either enter a valet mode or select a function the user first must enter a valid personal access code via the toggle switch. Therefore, an intruder is blocked from breaching the alarm's security via the valet switch even if the switch is installed in a place where it is in plain view and readily accessible by the intruder. In order to make the system further tamper proof, say when an intruder tries to decipher the code by trying various codes, the security system will ignore after a preset number of successive invalid entries any further switch inputs for a preset period of time. When attempts to decipher the code are detected, the alarm will trip and the siren will sound. To accommodate various drivers of the same vehicle, more than one code can be stored in the system. Upon successful entry of a valid code an acknowledgment is heard, and the user then has a preset period of time in which to place the switch in the valet position. When the secured valet mode is entered, both visual (flashing lights) and audible confirmations (either siren chirps, horn, piezo devices) may be generated. Lastly, since each car owner may have a preference for his or her own personal code the invention allows for easy and secured code changing any time the owner wishes, provided that the user's present code is entered prior to programming a new personal access code.

BRIEF DESCRIPTION OF THE DRAWING

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENT

Figure 1:
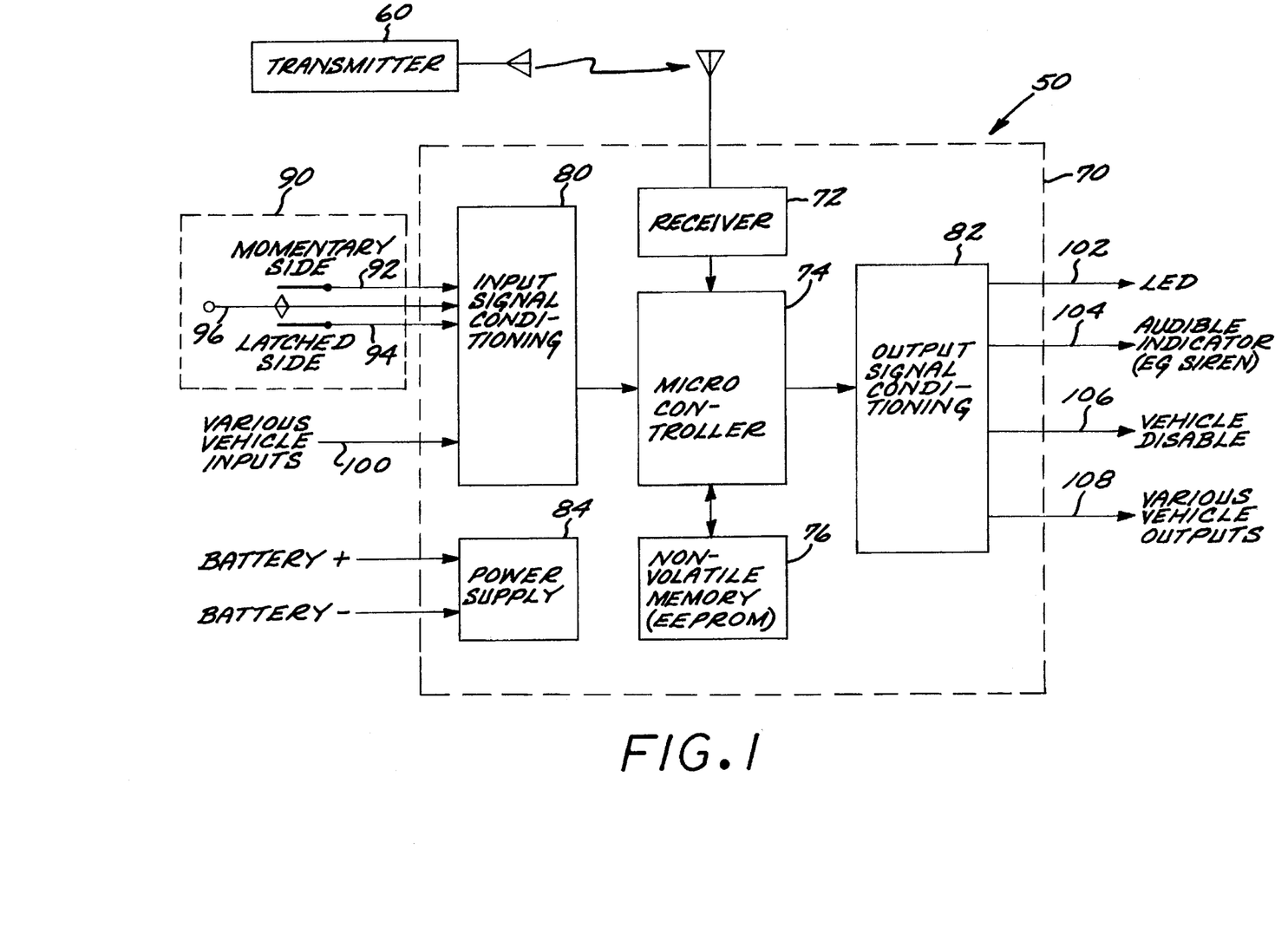
FIG. 1 is a simplified block diagram of a vehicle security system embodying the present invention.

FIG. 1 is a simplified block diagram of a vehicle security system 50 embodying the present invention. The system includes a remote control transmitter 60, and vehicle-installed components generally indicated as 70. Vehicle security systems with which the present invention may be used are described, for example, in commonly assigned U.S. Pat. Nos. 4,887,064 and 4,922,224, the entire contents of which are incorporated here by this reference. For clarity, many of the well-known components of the security system are not described in detail herein.

Preferably, the transmitter 60 is a multi-channel transmitter, capable of generating encoded commands for activating various functions. One channel is dedicated to activating the secure valet mode, and can be used to toggle the status of the system valet mode. Thus, a first activation of the valet channel on the transmitter causes the security system to enter the valet mode. A second activation of the valet channel causes the system to exit the valet mode, and so on. In each case, the signal generated by the transmitter and received by the vehicle installed components includes an access code before the system will respond to commands from the transmitter. A multi-channel transmitter suitable for the purpose is described in commonly assigned U.S. Pat. No. 4,890,108, the entire contents of which is incorporated herein by this reference.

The vehicle-installed components 70 include a receiver 72, which responds to commands received from the transmitter 60, a microcontroller 74 and a nonvolatile memory 76. Input signal conditioning circuitry 80 conditions signals received from a valet switch 90, and from the typical vehicle inputs commonly employed by electronic security systems, e.g., the ignition switch, door triggers, sensors and the like, to be compatible with the inputs to the microcontroller 74. Output signal conditioning circuitry 82 conditions control signals output by the microcontroller 74 to drive various output devices by the several output lines, e.g., line 102 to drive LEDs to provide visual indications signals, line 104 to drive an audible indications device such as a siren, line 106 to control a vehicle disabling means such as an ignition disable, fuel pump disable or starter disable, and line 108 to control various types of vehicle devices, e.g., hood lock, door locks and the like.

A power supply 84 is connected to the vehicle battery to supply power to the various components 70.

Virtually any switch can be used as the valet switch 90, but the switch of choice is a SPDT switch having the following characteristics: (a) center position—open, (b) latched side—closed, (c) momentary side—closed. This is the type of switch typically used for the valet switch in many vehicle security systems. Thus, in FIG. 1 the switch 90 includes a momentary side 92, a latched side 94, and a center conductor 96, which is moved by the user into contact with either side 92 or 94. The switch includes a spring (not shown) biasing the center conductor to return to the center position from the momentary side 92. When the center conductor 96 is moved into contact with the latch side 94, the center conductor 96 is latched to that position until the use moves the center conductor back to the center position. This configuration is selected since the switch's momentary side 92 lends itself for rapid entry of repeated actuations.

To enter a code in accordance with the invention, the user enters the code's digits in their order. To enter a digit the user taps (press and release) on the momentary side 92 of the valet switch 90 the number of times corresponding to the numeral of the digit to be entered followed by a motion to the latched side 94 to signal the completion of the digit. If the code has more than one digit, this process repeats itself until the entire code is entered. The number of digits allowed for the personal access code is limited in practice only by the memory space allocated for the personal access code in the security system 50. When a correct, valid code is entered and accepted, the system will issue an audible acknowledgment by activating the siren line 104 to generate a predetermined number of chirps assigned by the system to indicate to the user that a valid code has been entered.

For instance, if the code is 3,

1. The center conductor 96 of switch 90 is pressed to the momentary side 92 and released a number of times, corresponding to the digit being entered, i.e., three momentary presses for the number 3.

2. The center conductor 96 of switch 90 is then pressed to the latched side 94 and back to the center position to "enter" the digit, signifying the completion of that digit.

The process (steps 1 and 2) is repeated for each additional code digit to be entered in the case where the code has multiple digits. Once the code is fully entered, the center conductor 96 of switch 90 is set to the center position to signal to the system 50 the completion of the code. Thereafter, upon recognition by the system of entry of a valid code, the system may be put into the valet mode by setting the switch 90 to the latched position (side 94). In the valet mode, the security system is disabled, as is well known in the art. To exit the valid mode, the switch 90 is set to the center position, i.e., out of the latch position.

FIGS. 2–6 are flow diagrams illustrating the operation of the system 50, and representing functions programmed for execution by the microcontroller 74. At the powering up of the security system 50 (step 200), the microcontroller 74 fetches non-secure-valet-mode related initialization data from the memory 76, and initializes the security system 50 (step 202) in the conventional manner.

Figure 2:
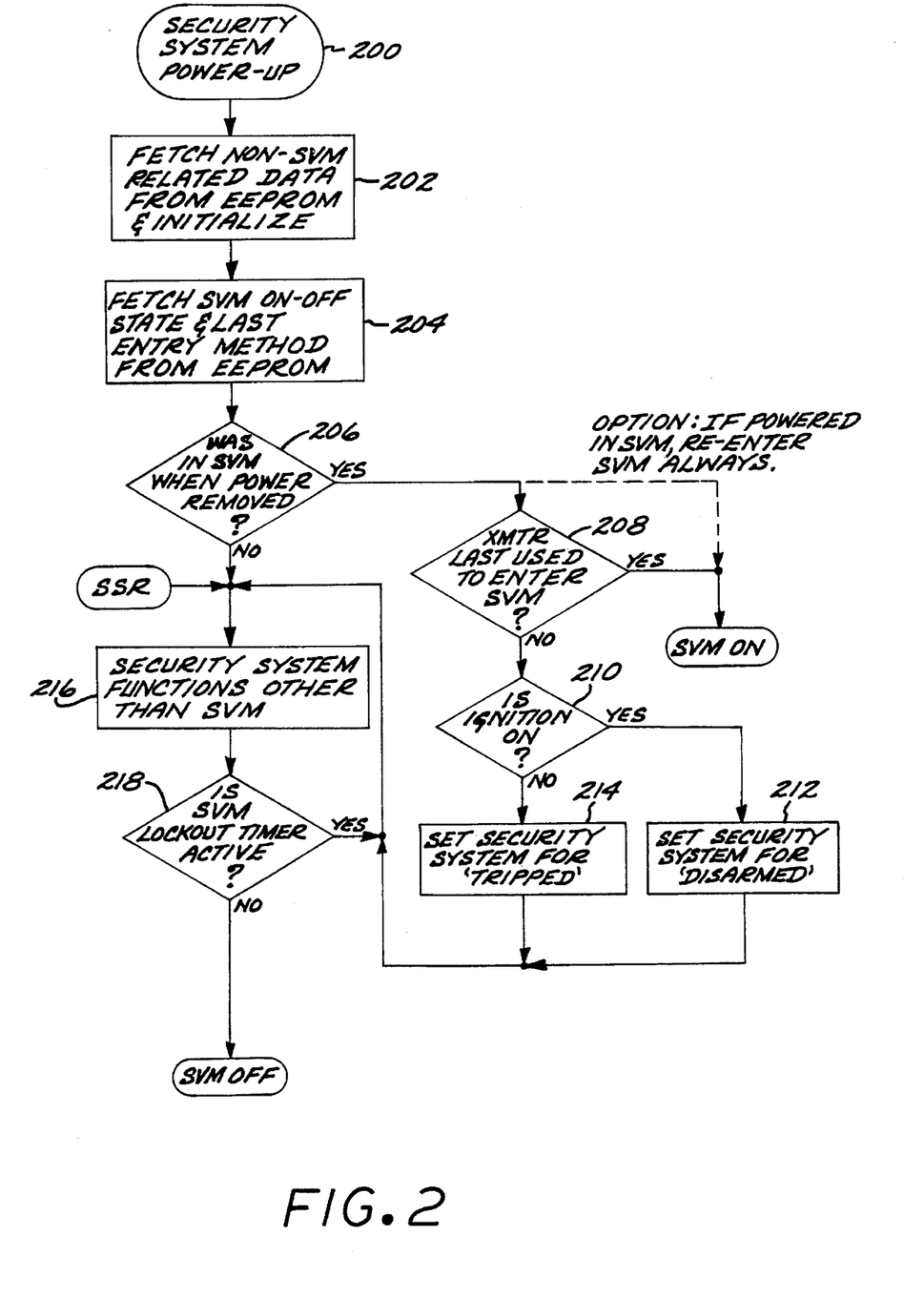
FIGS. 2–6 are flow diagrams illustrating the operation of the system of FIG. 1.

After the system has been initialized, SVM data is fetched from the memory (step 204), indicating whether the system was in the secure valet mode when power to the system was interrupted, and if so, how the system was put into the valet mode, i.e., by the remote transmitter 60 or by the valet switch 90. If the system was in the valet mode when power was interrupted (step 206), and if the transmitter was used to enter the valet mode (step 208), operation proceeds to node SVM-ON, FIG. 5. If the transmitter was not used to enter the valet mode, the system checks to determine whether the vehicle ignition switch is on (step 210). If on, the system assumes that an authorized person is in control of the vehicle, and the security system 50 is set to the disarmed mode (step 212). If the vehicle ignition switch is not on, the system assumes that the power was removed as a result of an unauthorized act, and sets the security system to the tripped state (step 214). Operation then proceeds to step 216, where the system executes functions unrelated to the valet mode. For example, the system will generate an alarm condition if the system had been set to the tripped state (step 214). At step 218, the status of an SVM lockout timer is checked, and if active, operation returns to step 216. The lockout timer is initiated by entry of a preset number of invalid codes via the valet switch; the system will ignore attempts to enter code data via the valet switch until the timer interval has elapsed. If the timer is active, the SVM mode cannot be entered. The SVM lockout timer is associated with anti-scanning functions to prevent a thief from attempting to defeat the security system by rapidly scanning different codes into the system. If the lockout timer is not active, operation proceeds to node SVM OFF, at FIG. 3.

In the operation just described, the system will upon power up, initialize in the secure valet mode only if that mode had been entered by the remote transmitter. Alternatively, the system could be configured to always power up in SVM if the system was in SVM when power was removed.

Figure 3:
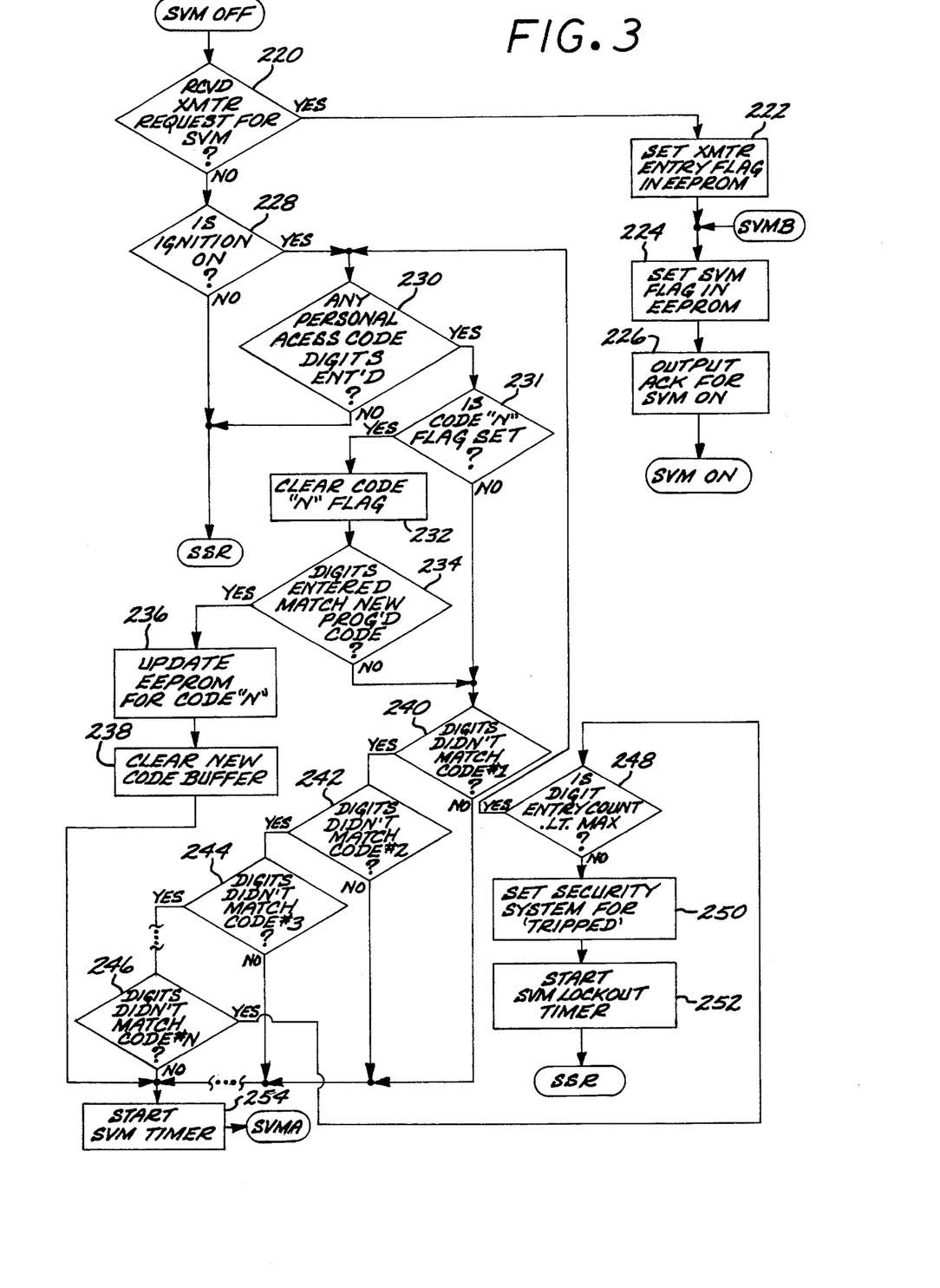

Referring now to FIG. 3, commencing from node SVM OFF entered from FIG. 2, at step 220, if a transmitter command to enter the SVM mode has been received, the XMTR ENTRY flag is set in the memory 76 (step 222), the SVM flag in memory is set (step 224), and audible and visible acknowledgements are generated (step 226) by LEDs and siren chirps by activating lines 102 and 104. Operation then proceeds to node SVM ON, FIG. 5.

If no transmitter request has been received (step 220), the ignition switch status is checked (step 228). If the ignition switch is not on, operation proceeds to node SSR (FIG. 2). If the ignition switch is on, the system determines whether any personal access code digits have been entered via the valet switch (step 230). If no digits have been entered, operation proceeds to node SSR. If digits have been entered, the status of the code N flag is checked. If the flag is set, this indicates that the user has just previously programmed a new security code via the system programming mode. The user validates the newly programmed code by having just entered it again. Thus, at step 232, the code N flag is cleared, and the digits entered via the valet switch are checked to determine whether they match the newly programmed code stored in a new code buffer. If so, the nonvolatile memory 76 is updated to store the new code "N" (step 236), and the new code buffer is cleared (step 238). If the entered digits do not match the newly programmed code, the digits are checked to determine whether they match any of the N security codes stored in memory 76 (steps 240–246). If any of the codes are matched, then the SVM timer is started (step 254), and operation proceeds to node SVMA, at FIG. 4. If none of the user security codes are matched by the entered digits, operation proceeds to step 248, where the number of received digits is tested against a preset maximum number. If the received number is less than the maximum, operation returns to step 230. If the received number of digits exceeds the maximum permissible number of digits, the security system is set for the tripped mode (step 250), and the SVM lockout timer is started (step 252). Operation then proceeds to node SSR (FIG. 2). The preset maximum number will typically be some multiple of the nominal code digit length. For example, if the typical code length is 3, then the maximum number might be set at 9. As shown, successive entries of invalid code digits exceeding the predetermined maximum number will trip the alarm and start the lockout timer. During the lockout time interval, the system will ignore any signals entered via the valet switch 90.

Figure 4:
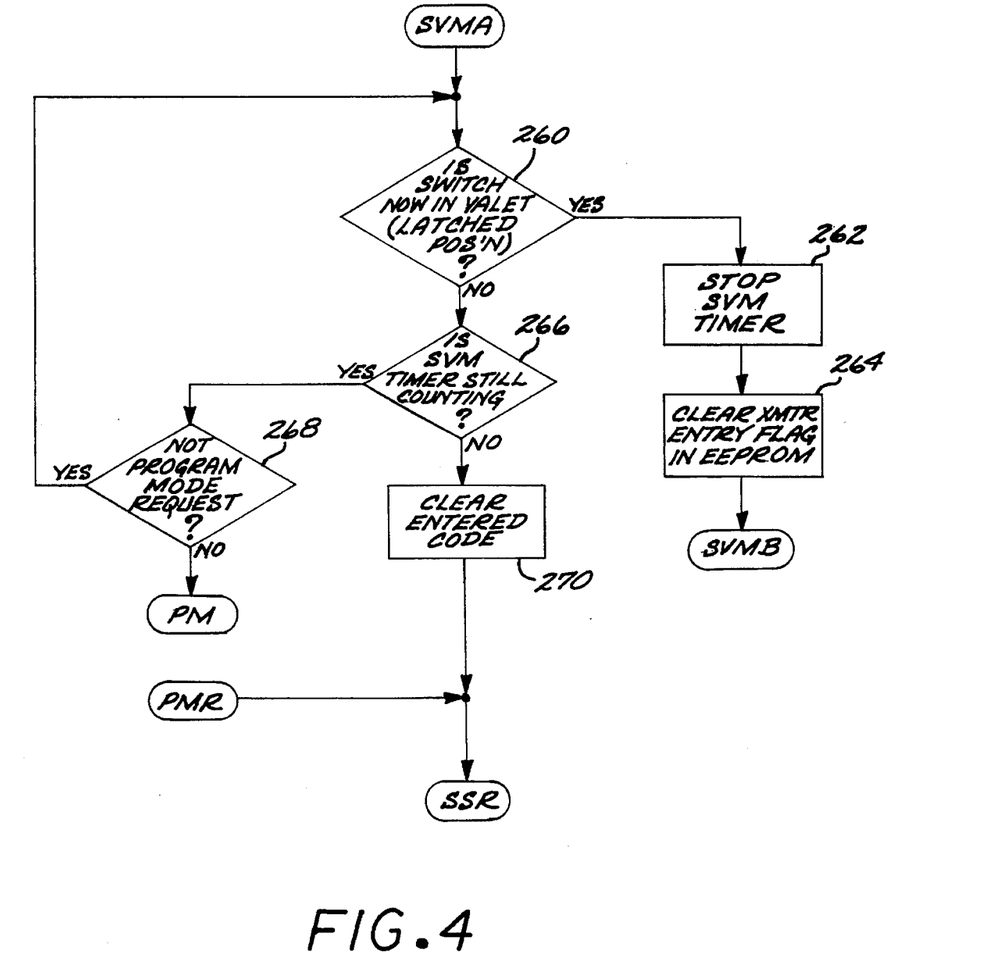

At FIG. 4, commencing from node SVMA, entered from step 254 (FIG. 3), the valet switch 90 position is checked to determine if it is in the valet position, i.e., the latched position (step 260), indicating that the valet mode is to be entered. If in the valet position, the SVM timer is stopped (step 262), the XMTR ENTRY flag is cleared at the memory 76, and operation proceeds to node SVMB (FIG. 3). If the valet switch is not in the valet position, the SVM timer is checked (step 266), and if it is still counting, operation proceeds to node PM (FIG. 6) if a program mode request has been made (step 268). If no program request has been made, operation returns to step 260. If the SVM timer is not still counting at step 266, the entered code is cleared (step 270), since instructions have not been entered within the preset time, and operation proceeds to node SSR (FIG. 2).

Figure 5:
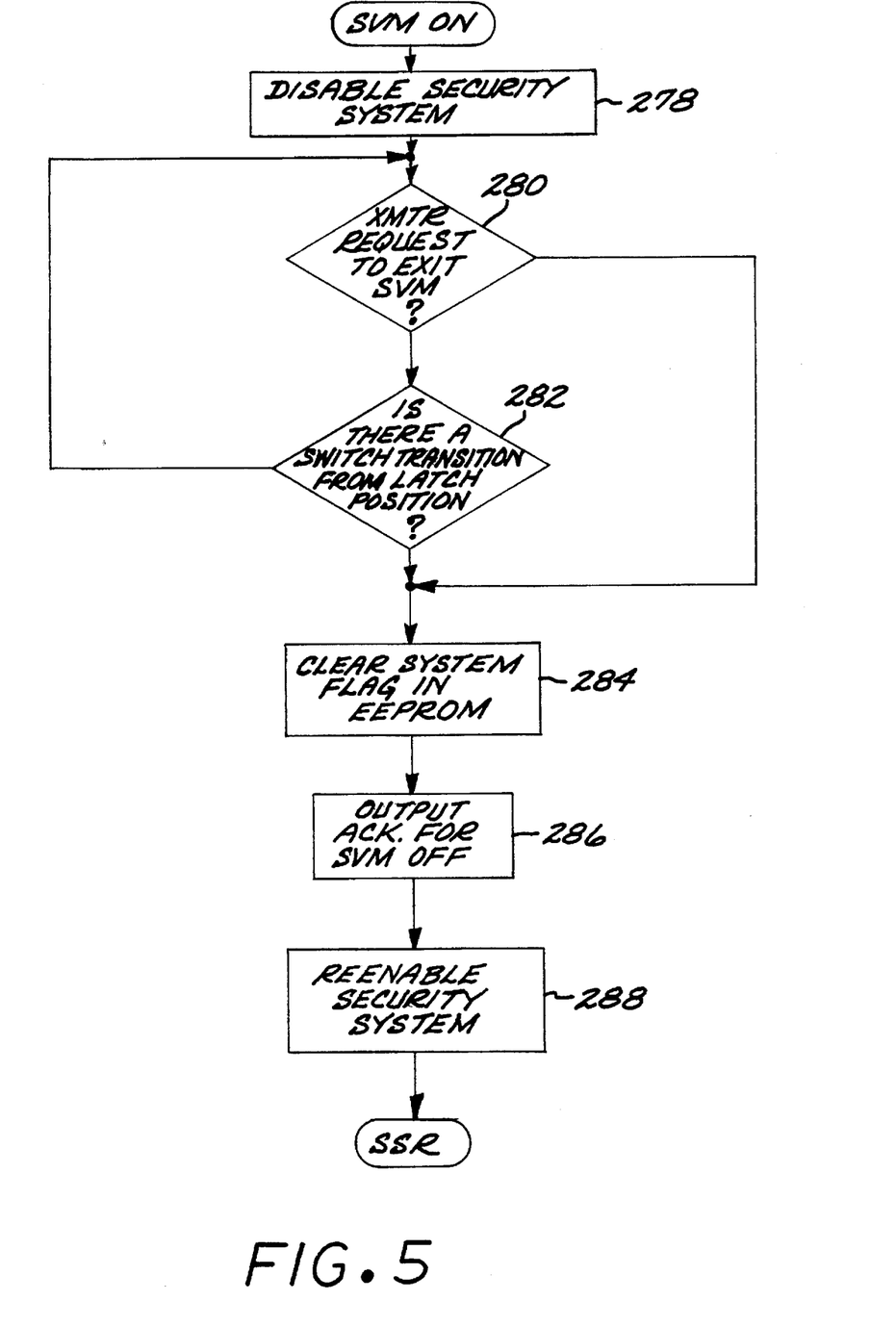

At FIG. 5, commencing from node SVM ON, entered from step 206 or step 208 (FIG. 2) or step 226 (FIG. 3), the security system functions are disabled at step 278. This is the effect of putting the security system in the valet mode. If a transmitter command has been received to exit the valet mode (step 280), operation proceeds to step 284, to clear the SVM flag in the memory 76, and to output an audible or visual acknowledgement that the valet mode has been exited (step 286). The security system functions are re-enabled (step 288), and operation proceeds to node SSR (FIG. 2). If no transmitter command has been received, the system checks to determine if there has been a switch transition from the latch position to the center position. If not, operation returns to step 280 and the process repeats. In this valet mode, the security system is disabled from activating an alarm.

Figure 6:
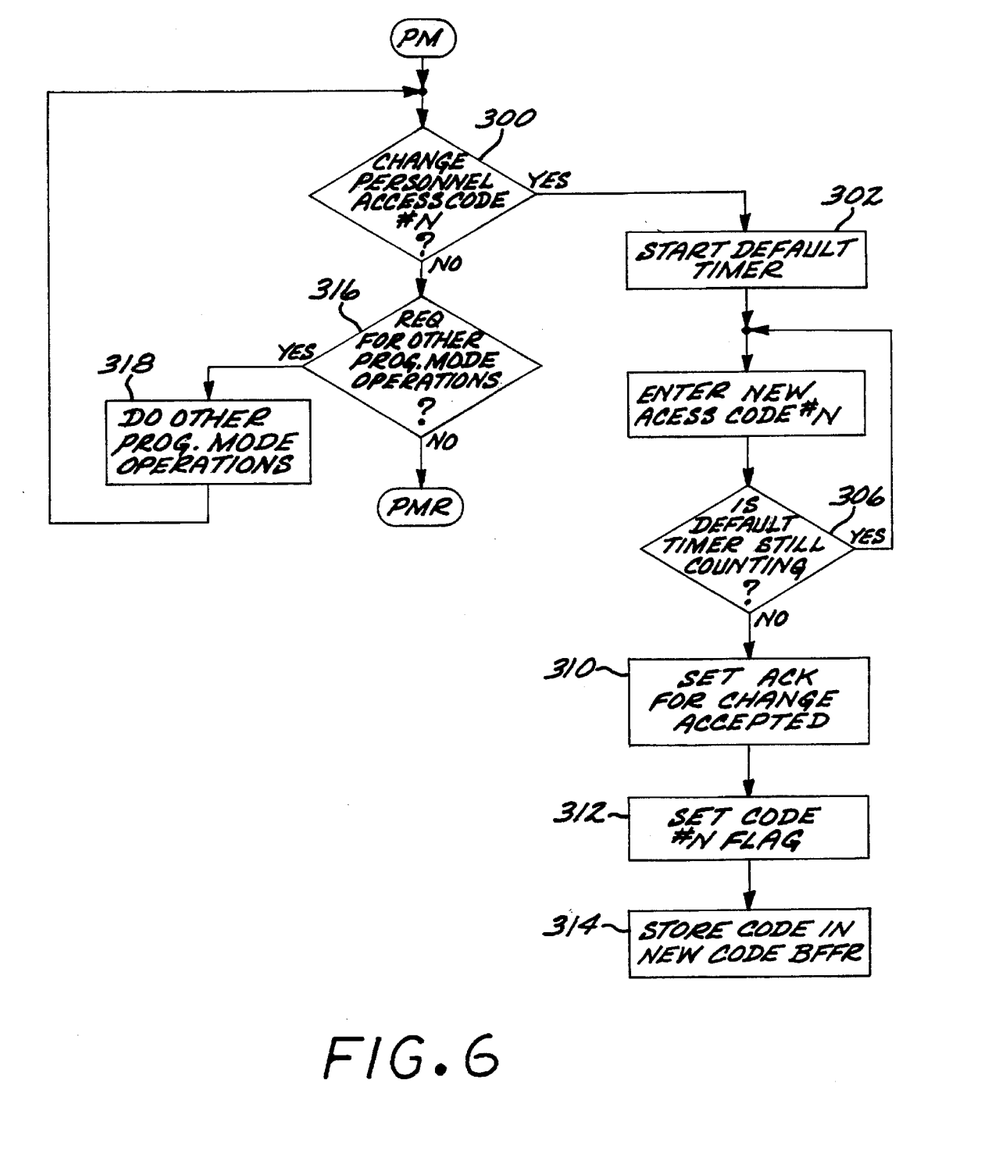

FIG. 6 illustrates the programming mode, entered at node PM, for entering a new personal access code, needed to enter the secure valet mode. Techniques to enter a security system program mode by use of a valet switch have previously been described in commonly assigned U.S. Pat. No. 4,887,064, e.g., FIGS. 19A–L and column 22 et seq.; and U.S. Pat. No. 4,922,224, e.g., FIGS. 15A–T and columns 21 et seq. For example, one technique for entering the program mode, as described in U.S. Pat. No. 4,922,224, is to hold the valet switch to the momentary side within ten seconds of turning the vehicle ignition switch on, until a siren chirp is heard, indicating the system is ready to receive programming instructions. In order to select a desired programming function, a digit associated with the desired function is entered. For example, to add a new personal access code to the stored list of valid access codes, a "one" is entered by toggling the valet switch once to the momentary side and once to the latched side. The system will first check the memory space available to determine if sufficient memory is available to add a new code. If enough memory is not available, the system can either provide an audible or visual signal indicating this circumstance, and then refuse to recognize any new codes, or write the new code over an existing valid code stored in memory, i.e., erase an existing code to make room for a new code. If space is available, the user enters the new code with the valet switch. If the desired programming function is to change an existing valid code stored in memory, the user enters a "two" for example to select this programming function, and thereafter enters the new code. The system will change the code entered initially to enter the programming mode to the newly entered code.

If a command to change a particular personal access code N is received (step 300), then a default timer is started (step 302), and the new access code N is entered by the user (step 304) while the default timer is still counting a predetermined default time interval (step 306). After the default time interval has elapsed, an audible and/or visual acknowledgement is performed (step 310), the CODE N flag is set, the new code is stored in the new code buffer (step 314), and operation returns to step 300.

If no command had been entered to change a personal access code (step 300), operation proceeds to node PMR (FIG. 4) if no other command for other programming operations has been received (step 316). If a command for another programming operation has been received, e.g., one of the programming functions described in U.S. Pat. No. 4,922,224, the other programming operations are performed (step 318), and operation returns to step 300.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A vehicle security system having a secure valet mode of operation, comprising:

a first user-operated communication device for generating a coded arm/disarm signal for putting said security system in an armed state or in a disarmed state, wherein when said system is in said armed state and is tripped, an alarm is generated, and when said system is in said disarmed state, said system is responsive to predetermined arming conditions to be put into said armed state;

a user-operated valet switch means disposed within said vehicle;

a system controller responsive to valet mode signals entered via said valet switch means to enter a secure valet mode wherein said system is turned off and thereby disabled from tripping and generating an alarm, and is further disabled from being put into said armed state so long as said system in said secure valet mode, said controller comprising means for comparing said valet mode signals to a predetermined valid valet access code, and means permitting said system to be put into said secure valet mode in response to signals entered via said valet switch means only if said signals comprise said valid valet access code, said system controller further comprising means responsive to receipt of said coded arm/disarm signals for arming or disarming said security system if said system is not in said secure valet mode, wherein said secure valet mode may be entered via signals received from said valet switch means only if said predetermined access code is first entered via said switch means.

2. The system of claim 1 wherein said valet switch means comprises a switch having first and second positions.

3. The system of claim 2 wherein said access code comprises one or more digits, and wherein said code is entered via said valet switch means by successively putting said switch to said first position a number of times equal to said code digit, and wherein said one or more digits are entered by putting said switch means to second position.

4. The system of claim 3 wherein said first position is a momentary position, and said second position is a latched position, and wherein said system may be put into said valet mode by entering said access code via said valet switch, and thereafter putting said switch to the latched position.

5. The system of claim 1 wherein said controller further comprises means activated upon entry of a predetermined number of successive invalid code signals via said valet switch means for ignoring any further valet switch signals for a predetermined lockout time interval.

6. The system of claim 1 further comprising alarm means activated by said controller for generating alarm signals, and wherein said controller further comprises means for activating said alarm means upon entry of a predetermined number of successive invalid code signals via said valet switch means.

7. The system of claim 6 wherein said alarm means comprises a siren.

8. The system of claim 1 wherein said controller comprises means for comparing said valet switch signals to a plurality of predetermined valid access codes, and means permitting said system to be put into said secure valet mode if said valet switch signals correspond to any one of said plurality of valid access codes.

9. The system of claim 1 further comprising means for generating an acknowledgement signal to the system user indicative of entry of a valid access code via said valet switch means, and said controller further comprises means for activating said generating means upon entry of a valid access code via said valet switch means.

10. The system of claim 9 wherein said acknowledgement signal comprises an audible signal.

11. The system of claim 1 wherein said valet switch means comprises a valet switch position, and wherein said controller is responsive to said valet switch means being put into the valet switch position to put said system into said secure valet mode only after said valid access code has been entered via said valet switch means.

12. The system of claim 11 wherein said controller further comprises timer means initiated after entry of said valid access code via said valet switch means for timing a preset time interval, and means for canceling entry of said valid access code via said valet switch means unless said switch means is set to said valet position before expiration of said time interval, wherein said system may be put into said secure valet mode via signals received from said valet switch means only if said valet switch means is set to said valet position within said time interval of entry of said valid code.

13. The system of claim 1 further comprising means activated by said controller upon entry of said system into said valet mode for generating a confirmation signal to the user that said system has been put into said secure valet mode.

14. The system of claim 13 wherein said confirmation signal comprises an audible signal.

15. The system of claim 13 wherein said confirmation signal comprises a visible signal.

16. The system of claim 1 wherein said controller further comprises means for changing said valid access code by command signals entered via said valet switch means during a system programming mode.

17. The system of claim 16 wherein said means for changing said valid access code is activated only after entry of the valid access code via said valet switch means.

18. The system of claim 1 further comprising means for entering and exiting said secure valet mode via signals received from a remote control transmitter.

19. A vehicle security system having a secure valet mode of operation, comprising:

alarm means;

a first user-operated communication device for generating a coded arm/disarm signal for putting said security system in an armed state or in a disarmed state, wherein when said system is in said armed state and is tripped, said alarm means is activated, and when said system is in said disarmed state, said system is responsive to predetermined arming conditions to be put into said armed state;

a user-operated valet switch disposed within said vehicle, said switch having a first position and a second position;

a system controller responsive to valet mode signals entered via said valet switch to enter a secure valet mode wherein said system is turned off and thereby disabled from tripping said alarm means, and is further disabled from being put into said armed state so long as said system in said secure valet mode, said controller comprising means for comparing said valet mode signals to one or more predetermined valid access codes, and means permitting said system to be put into said valet mode in response to signals entered via said valet switch only after valet mode signals corresponding to said valid access code have been entered, said permitting means responsive to the valet switch being set to said first position, said system controller further comprising means responsive to receipt of said coded arm/disarm signals for arming or disarming said security system if said system is not in said secure valet mode;

wherein said secure valet mode may be entered via setting said valet switch to the first position only if said predetermined access code is first entered via said valet switch.

20. The system of claim 19 wherein said one or more access codes comprise one or more digits, and wherein said one or more codes is entered via said valet switch by successively putting said switch to said second position a number of times equal to said code digit, and wherein said digits are entered by putting said switch to said first position.

21. The system of claim 19 wherein said controller further comprises means activated upon entry of a predetermined number of successive invalid code signals via said valet switch for ignoring any further valet switch signals for a predetermined lockout time interval.

22. The system of claim 19 wherein said controller further comprises means for activating said alarm means upon entry of a predetermined number of successive invalid code signals via said valet switch.

23. The system of claim 19 wherein said alarm means comprises a siren.

24. The system of claim 19 wherein said controller comprises means for comparing said valet switch signals to a plurality of predetermined valid access codes, and means permitting said system to be put into said valet mode if said valet switch signals correspond to any one of said plurality of valid access codes.

25. The system of claim 19 further comprising means for generating an acknowledgement signal to the system user indicative of entry of a valid access code via said valet switch, and said controller further comprises means for activating said generating means upon entry of a valid access code via said valet switch.

26. The system of claim 25 wherein said acknowledgement signal comprises an audible signal.

27. The system of claim 19 further comprising means activated by said controller upon entry of said system into said valet mode for generating a confirmation signal to the user that said system has been put into said valet mode.

28. The system of claim 27 wherein said confirmation signal comprises an audible signal.

29. The system of claim 27 wherein said confirmation signal comprises a visible signal.

30. The system of claim 19 wherein said controller further comprises means for changing said valid access code by command signals entered via said valet switch during a system programming mode.

31. The system of claim 30 wherein said means for changing said valid access code is activated only after entry of the valid access code via said valet switch.

32. The system of claim 19 further comprising means for entering and exiting said secure valet mode via signals received from a remote control transmitter.

33. A vehicle security system having a secure valet mode of operation, comprising:

means for performing security functions in the event said system is tripped when said system is armed;

remote control wireless transmitter means for generating a first set of remote control command signals on a first channel to arm or disarm said system, and a second set of remote control command signals on a second channel for said system to enter said secure valet mode;

a system controller responsive to said first set of remote control command signals to arm or disarm said security system, and to said second set of remote control commands signals to enter a secure valet mode wherein said system is turned off and thereby disabled from tripping and performing said security functions, and is disabled from responding to said first set of remote control command signals to arm said system so long as said system is in said valet mode, said controller comprising means for putting said system into said secure valet mode in response to said remote control command signals;

wherein said valet mode may be entered via wireless remote control signals received from said transmitter means.

34. The vehicle security system of claim 33 wherein said controller further comprises means operative in the event said system is in the secure valet mode and responsive to remote control command signals from said remote transmitter to exit said secure valet mode.

35. The system of claim 33 wherein said controller comprises means for comparing said remote control command signals to a predetermined valid access code, and said means for putting said system into said secure valet mode is operable only in the event said remote control command signals comprise said valid access code.

36. The system of claim 33 wherein said controller further comprises valet mode exit means operative in the event said system is in the secure valet mode and responsive to remote control command signals on said second channel from said remote transmitter to exit said secure valet mode.

37. A vehicle security system, comprising:

a first user-operated communication device for generating a coded arm/disarm signal for putting said security system in an armed state or in a disarmed state, wherein when said system is in said armed state and is tripped, an alarm is generated, and when said system is in said disarmed armed state, said system is responsive to predetermined arming conditions to be put into said armed state;

a user-operated valet switch means disposed within said vehicle;

a system controller responsive to signals entered via said valet switch means for affecting security system functions, said functions comprising a valet mode wherein said system is turned off and thereby disabled from tripping and generating an alarm condition, said controller comprising means for comparing said valet switch signals to a predetermined valid access code, and means for putting said system in said valet mode in response to signals entered via said valet switch means only if said signals comprise signals corresponding to said valid access code, and wherein said controller further comprises means responsive to receipt of said coded arm/disarm signal for arming or disarming said security system, said arming/disarming means being disabled when said system is in said valet mode.

38. The system of claim 37 wherein said valet switch means comprises a valet switch position, and wherein said controller is responsive to said valet switch means being put into the valet switch position to enter said valet mode only after said valid access code has been entered via said valet switch means.

39. The system of claim 37 wherein said security system functions comprise a programming function mode to program features of said system, and said controller is responsive to said valet switch signals to enter said programming mode only in the event said signals comprise said valid access code.

40. The system of claim 39 wherein said programming mode is to program said system with a valid access code.

41. The system of claim 39 wherein said controller is responsive to valet switch signals comprising a command to enter said programming mode which are entered after valet switch signals have been entered comprising said valid access code.

42. The system of claim 37 wherein said valet switch means comprises a single pole double throw switch having first and second positions.

43. The system of claim 42 wherein said access code comprises one or more digits, and wherein said code is entered via said valet switch by successively putting said switch to said first position a number of times equal to said code digit, and wherein said one or more digits are entered by putting said switch to said second position.

44. The system of claim 37 wherein said controller further comprises means activated upon entry of a predetermined number of successive invalid code signals via said valet switch means for ignoring any further valet switch signals for a predetermined lockout time interval.

45. The system of claim 37 further comprising alarm means activated by said controller for generating alarm signals, and wherein said controller further comprises means for activating said alarm means upon entry of a predetermined number of successive invalid code signals via said valet switch means.

46. The system of claim 45 wherein said alarm means comprises a siren.

47. The system of claim 37 wherein said controller comprises means for comparing said valet switch signals to a plurality of predetermined valid access codes, and said means for affecting security system functions acts in response to receipt of valet switch signals only if said signals comprise any one of said valid access codes.

48. The system of claim 37 further comprising means for generating an acknowledgement signal to the system user indicative of entry of a valid access code via said valet switch means, and said controller further comprises means for activating said generating means upon entry of a valid access code via said valet switch means.

49. The system of claim 48 wherein said acknowledgement signal comprises an audible signal.

50. The system of claim 48 wherein said confirmation signal comprises a visible signal.

51. The system of claim 37 further comprising means for entering a system valet mode via signals received from a remote control transmitter, wherein said system is disabled from tripping to generate an alarm condition.

52. A vehicle security system, comprising:
    a first user-operated communication device for generating a coded arm/disarm signal for putting said security system in an armed state or in a disarmed state, wherein when said system is in said armed state and is tripped, an alarm is generated, and when said system is in said disarmed state, said system is responsive to predetermined arming conditions to be put into said armed state;
    a user-operated switch disposed within said vehicle;
    a system controller responsive to signals entered via said switch and to a position of a vehicle ignition switch for affecting security system functions, said functions comprising a valet mode wherein said security system is turned off and disabled from tripping and generating an alarm condition, said controller comprising means for comparing said switch signals to a predetermined valid access code, and means for putting said system in said valet mode in response to signals entered via said switch means only if said vehicle ignition switch is in an on position and said signals comprise signals corresponding to said valid access code, said system controller further comprising means responsive to receipt of said coded arm/disarm signal for arming or disarming said security system, said arming/disarming means being disabled when said system is in said valet mode.

53. The system of claim 52 wherein said switch comprises a valet switch position, and wherein said controller is responsive to said switch being put into the switch position to enter said valet mode only after said valid access code has been entered via said switch.

54. The system of claim 52 wherein said security system functions comprise a programming function mode to program features of said system, and said controller is responsive to said switch signals to enter said programming mode only in the event said signals comprise said valid access code.

55. The system of claim 54 wherein said programming mode is to program said system with a valid access code.

56. The system of claim 54 wherein said controller is responsive to switch signals comprising a command to enter said programming mode which are entered after switch signals have been entered comprising said valid access code.

57. The system of claim 52 wherein said switch has first and second positions, and said access code comprises one or more digits, and wherein said code is entered via said switch by successively putting said switch to said first position a number of times equal to said code digit, and wherein said one or more digits are entered by putting said switch to said second position.

58. The system of claim 52 wherein said controller further comprises means activated upon entry of a predetermined number of successive invalid code signals via said switch for ignoring any further switch signals for a predetermined lockout time interval.

59. The system of claim 52 further comprising alarm means activated by said controller for generating alarm signals, and wherein said controller further comprises means for activating said alarm means upon entry of a predetermined number of successive invalid code signals via said switch.

60. The system of claim 52 wherein said controller comprises means for comparing said switch signals to a plurality of predetermined valid access codes, and said means for affecting security system functions acts in response to receipt of switch signals only if said signals comprise any one of said valid access codes.

61. The system of claim 52 further comprising means for generating an acknowledgement signal to the system user indicative of entry of a valid access code via said switch, and said controller further comprises means for activating said generating means upon entry of a valid access code via said switch.

62. The system of claim 52 further comprising means for entering a system valet mode via signals received from a remote control transmitter, wherein said system is disabled from tripping to generate an alarm condition.

63. A vehicle security system having a secure valet mode of operation, comprising:
    a user-operated valet switch means disposed within said vehicle, said valet switch means comprising a valet switch position;
    a system controller responsive to valet mode signals entered via said valet switch means to enter a secure valet mode wherein said system is disabled from tripping and generating an alarm, said controller comprising means for comparing said valet mode signals to a predetermined valid access code, and means permitting said system to be put into said valet mode in response to said valet switch means thereafter being put into the valet switch position only if said valet mode signals comprise said valid access code, and wherein said controller is responsive to said valet switch means being put into the valet switch position to put said system into said valet mode only after said valid access code has been entered via said valet switch means;
    said controller further comprises timer means initiated after entry of said valid access code via said valet switch means for timing a preset time interval, and means for canceling entry of said valid access code via said valet switch means unless said switch means is set to said valet position before expiration of said time interval, wherein said system may be put into said valet mode via signals received from said valet switch means only if said valet switch means is set to said valet position within said time interval of entry of said valid code.

64. A vehicle security system having a secure valet mode of operation, comprising:

alarm means;

a user-operated valet switch disposed within said vehicle, said switch comprising a single pole double throw switch having a first position and a second position;

a system controller responsive to signals entered via said valet switch to enter a secure valet mode wherein said system is disabled from tripping said alarm means, said controller comprising means for comparing said valet mode signals to one or more predetermined valid access codes, and means permitting said system to be put into said valet mode in response to signals entered via said valet switch only after valet switch signals correspond to said valid access code have been entered, said permitting means responsive to the valet switch being set to said first position, wherein said valet mode may be entered via setting said valet switch to the first position only if said predetermined access code is first entered via said valet switch; and wherein said controller further comprises timer means initiated after entry of said valid access code via said valet switch for timing a preset time interval, and means for canceling entry of said valid access code via said valet switch unless said switch is set to said first position before expiration of said time interval, wherein said system may be put into said valet mode via signals received from said valet switch only if said valet switch is set to said first position within said time interval of entry of said valid code.

65. The system of claim 1 wherein said first user communication means comprises a remote wireless transmitter.

66. The system of claim 1 wherein said system controller is further responsive to an "on" position of a vehicle ignition switch, and enters said valet mode only if said switch is in said "on" position when said valet mode signals are entered via said valet switch.

67. The system of claim 19 wherein said first user communication means comprises a remote wireless transmitter.

68. The system of claim 19 wherein said system controller is further responsive to an "on" position of a vehicle ignition switch, and enters said valet mode only if said switch is in said "on" position when said valet mode signals are entered via said valet switch.

69. The system of claim 37 wherein said first user communication means comprises a remote wireless transmitter.

70. The system of claim 37 wherein said system controller is further responsive to an "on" position of a vehicle ignition switch, and enters said valet mode only if said switch is in said "on" position when said valet mode signals are entered via said valet switch.

71. The system of claim 52 wherein said first user-communication means comprises a remote wireless transmitter.

72. The system of claim 52 wherein said system controller is further responsive to an "on" position of a vehicle ignition switch, and enters said valet mode only if said switch is in said "on" position when said valet mode signals are entered via said valet switch.

* * * * *